United States Patent [19]
Kainulainen

[11] Patent Number: 5,878,095
[45] Date of Patent: Mar. 2, 1999

[54] HIERARCHICAL SYNCHRONIZATION METHOD

[75] Inventor: Jukka Kainulainen, Helsinki, Finland

[73] Assignee: Nokia Telecommunications Oy, Espoo, Finland

[21] Appl. No.: 700,380

[22] PCT Filed: Feb. 28, 1995

[86] PCT No.: PCT/FI95/00110

§ 371 Date: Aug. 14, 1996

§ 102(e) Date: Aug. 14, 1996

[87] PCT Pub. No.: WO95/24772

PCT Pub. Date: Sep. 14, 1995

[30] Foreign Application Priority Data

Mar. 1, 1994 [FI] Finland ................................... 940979

[51] Int. Cl.$^6$ .................................................... H04L 7/00
[52] U.S. Cl. .................... 375/357; 340/825.14; 370/503; 375/356
[58] Field of Search .................... 375/356, 357, 375/359, 224, 354; 370/507, 503, 516, 216, 519, 252; 364/481, 550, 561; 395/551; 340/825.06, 825.14, 825.2, 825.4; 379/1; 455/67.1

[56] References Cited

U.S. PATENT DOCUMENTS

| | | | |
|---|---|---|---|
| 2,986,723 | 5/1961 | Darwin et al. ........................... | 340/147 |
| 4,142,069 | 2/1979 | Stover ..................................... | 370/507 |
| 4,736,393 | 4/1988 | Grimes et al. .......................... | 370/507 |
| 4,837,850 | 6/1989 | Maisel et al. . | |
| 4,939,752 | 7/1990 | Literati et al. . | |
| 5,222,229 | 6/1993 | Fukuda et al. . | |
| 5,359,595 | 10/1994 | Weddle et al. . | |

FOREIGN PATENT DOCUMENTS

| | | |
|---|---|---|
| 490 315 | 6/1992 | European Pat. Off. . |
| 92358 | 7/1994 | Finland . |

OTHER PUBLICATIONS

CCITT Recommendation G.703, Geneva, 1991.
CCITT Recommendation G.704, Geneva, 1991.
ITU–T, Telecommunication Standardization Sector of ITU, G.708, Mar. 1993.
ITU–T, Telecommunication Standardization Sector of ITU, G.709, Mar. 1993.
ISO/IEC JTC1/SC6/WG6 N, Telecommunications and Information Exchange between Systems Private Integrated Services Networking, Jul. 1992.

*Primary Examiner*—Jason Chan
*Assistant Examiner*—Jean B Corrielus
*Attorney, Agent, or Firm*—Pillsbury Madison & Sutro LLP

[57] ABSTRACT

A hierarchical synchronization method and equipment for a node in a telecommunications system employing message-based synchronization and comprising a plurality of nodes interconnected by transmission lines. Signals containing synchronization messages having a synchronization signature are interchanged with neighboring nodes, the synchronization signature indicating the priority of the respective signal in the internal synchronization hierarchy of the telecommunications system and containing a distance parameter representing a distance to a master source of synchronization and a master node parameter indicating an original synchronization source. The node synchronizes with the one of signals received from the neighboring nodes which has the highest priority in the internal synchronization hierarchy. A synchronization list is maintained, the list comprising, on the highest level, the synchronization signature of the signal with which the node is synchronized. The distance parameter and the master node parameter in the synchronization signature on the highest level in the priority list are monitored. The method includes changing over from a normal state to a predetermined state in order to prevent synchronization with signals having faulty synchronization signatures when the value of the distance parameter increases a predetermined number of times within a predetermined monitoring period while the master node parameter remains unchanged within the monitoring period.

7 Claims, 5 Drawing Sheets

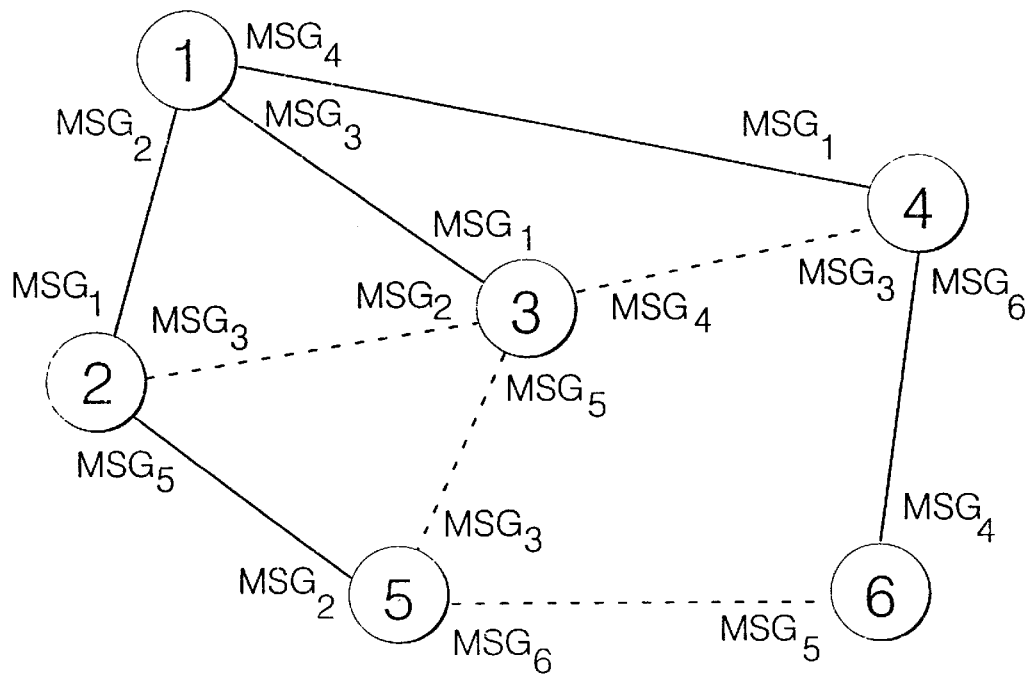
FIG. 1  PRIOR ART
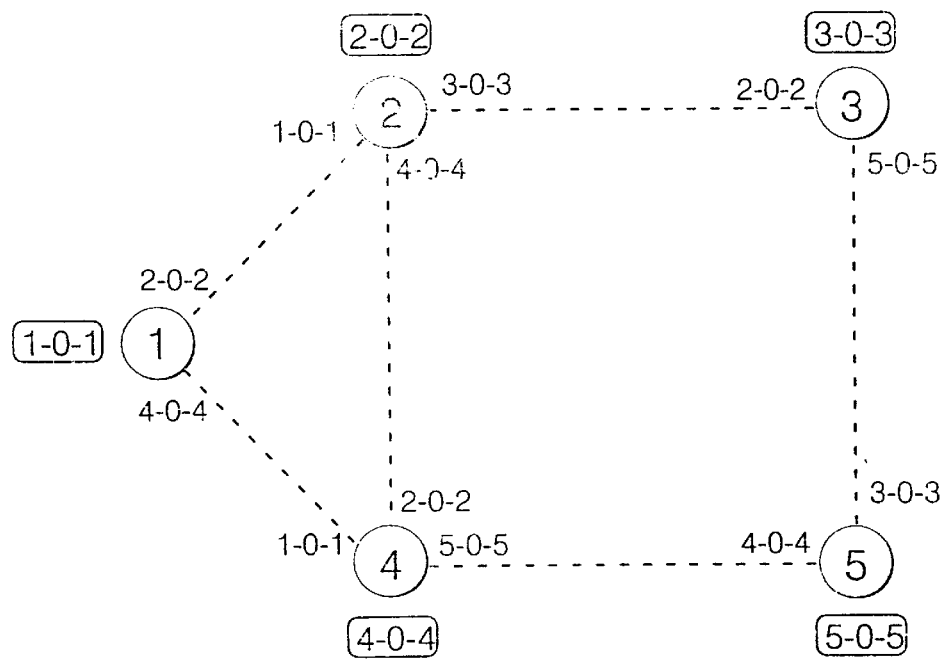
PRIOR ART  FIG. 2

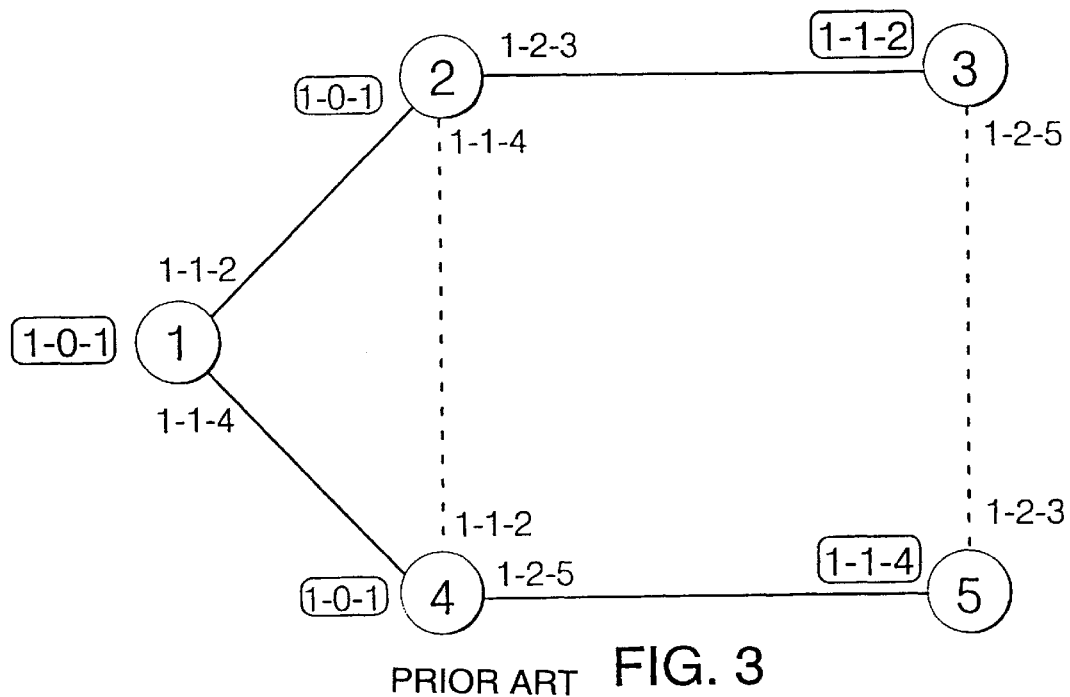
PRIOR ART FIG. 3
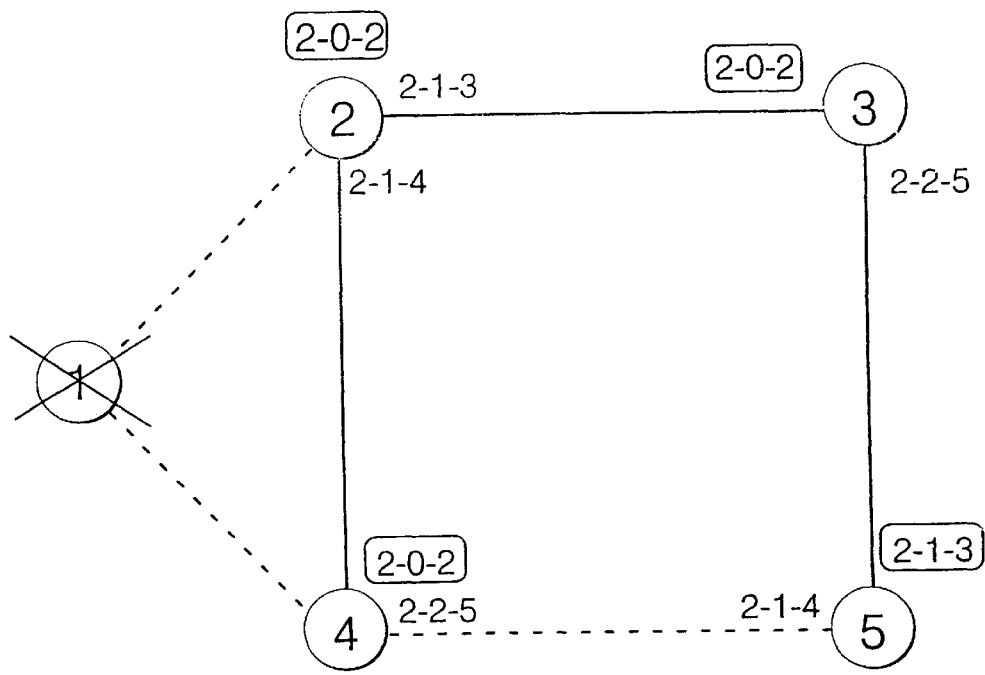
FIG. 4
PRIOR ART

HIERARCHICAL SYNCHRONIZATION METHOD

This application claims benefit of international application PCT/FI95/00110, filed Feb. 28, 1995.

1. Field of the Invention

The invention relates to a hierarchical synchronization method, the method being used in a telecommunications system employing message-based synchronization and comprising a plurality of nodes interconnected by transmission lines. The invention also relates to a node equipment for telecommunications systems employing message-based synchronization and comprising a plurality of nodes interconnected by transmission lines realizing such a method.

2. Background

In this presentation, the junction points of the transmission lines in a system are called nodes. A node may be any device or equipment capable of affecting clock synchronization, such as a branching or cross-connection means.

Nodes in a system utilizing message-based synchronization are interconnected by transmission lines which the nodes use for data transmission. These lines also forward the clock frequency of the transmitting party to the receiving party. Each node selects as the source of its own clock frequency either the frequency of a signal from a neighbouring node, the frequency of its own internal clock source, or a frequency brought into the node from an external clock source through a separate synchronization input. In order that all nodes in the system would operate at the same clock frequency, the aim is usually to make the system synchronize itself with a single clock source called a master source. All system nodes connected directly to the selected master source are thus synchronized with the master source while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy could be established within the system, the system nodes interchange synchronization messages. These messages contain information by means of which individual nodes are able to select a timing source. The system nodes are prioritized and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighbouring clock frequency which originates from a desired node and which is of the highest quality can be selected by an individual node as the source of its own clock frequency. At the system start-up each node selects its own internal clock source as the source of its clock frequency as it has not yet processed any incoming synchronization messages. After the node has processed the first incoming synchronization messages, it selects the clock frequency of a neighbouring node having the highest level of priority as the source of its clock frequency. After all messages have been distributed over the system and the system has achieved a stable state as far as synchronization is concerned, the system has been synchronized hierarchically with the clock frequency of the master source.

FIG. 1 shows a system utilizing message-based synchronization in a stabilized situation. Priorities assigned to the nodes are indicated by numbers within the circles representing the nodes. The smaller the number, the higher the priority of the node. Synchronization messages transmitted by a node n (n=1 ... 6) are indicated by the reference $MSG_n$. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Message-based synchronization is based on a simple principle that the user defines the synchronization hierarchy of the system nodes by assigning each node a dedicated signature indicating the hierarchical level of the node and the system synchronizes itself with the defined master clock independently by utilizing, if required, all existing internodal connections. If the connection to the master clock breaks, and no alternative connection exists, or if the master clock fails, the system synchronizes itself with a node of the next highest level of hierarchy. Response to the change in synchronization takes place by message interchange between nodes.

A message-based synchronization method of the type disclosed above is described e.g. in U.S. Pat. No. 2,986,723, which is referred to for a more detailed description. Messages used in this type of known message-based synchronization method (SOMS) are described in greater detail below in connection with FIGS. 2 and 3, since the method according to the present invention is applicable for example in this type of system.

In a system utilizing message-based synchronization, an outdated synchronization signature having the wrong synchronization status may keep on circulating in the network in failure situations despite checkings, and in circulating in the network it will soon bring about disorder in the synchronization of the entire network.

The known synchronization methods described in the literature are based on the idea that no outdated messages remain in the network; however, these descriptions contain no protection procedures to ensure this situation. The method according to the aforementioned U.S. Pat. No. 2,986,723 suggests that the old messages be eliminated from the network by utilizing time periods during which no new messages are accepted, but a certain state is retained so that the old signatures disappear from the network. If old signatures still remain in the network after these time periods have expired, no methods with which the system could recover from this situation have been provided.

SUMMARY OF THE INVENTION

The purpose of the present invention is to provide a simple method by means of which it is possible to detect, as reliably as possible, an outdated synchronization signature circulating in the network. This aim is achieved with the method according to the invention which is characterized by what is described in the characterizing portion of the appended claim 1. The node equipment according to the invention is in turn characterized by what is described in the characterizing portion of the appended claim 7. The arrangement according to the invention may be used as the only means of detection or as additional backup for other methods, so that the old messages can be eliminated with the greatest possible certainty.

The idea of the invention is to monitor both the distance parameter which is contained in the synchronization signature of a source on the top of the node's priority list and which describes the distance to the master source of timing, and the parameter contained in the synchronization signature and describing the original synchronization source, and to enter into a predetermined state in order to prevent the selection of faulty synchronization signatures, if the value describing the distance increases often enough during a predetermined short period of time while the parameter describing the original synchronization source remains the same, however, during the same short time period. The solution according to the invention can thus be utilized in networks where the synchronization signature comprises in some form information about the distance to the master clock of the network and about the original timing source, and where the node utilizes this information as a criterion for selection (possibly together with the quality parameter describing the original timing source). Methods fulfilling these requirements include for example the aforementioned SOMS method and the method disclosed in *Information to ISO/IEC CD* 11573 — *Information Technology — Telecommunication and Information Exchange between Systems — Synchronization Methods and technical requirements for PISNs,* ISO/IEC JTC1/SC6/WG6 N, July 1992 (reference 1).

By means of the arrangement according to the invention it is possible to detect the occurrence of disorder in synchronization already at an early stage and to recover from this situation before the synchronization of the entire network gets in disorder.

BRIEF DESCRIPTION OF THE DRAWINGS

In the following, the invention and its preferred embodiments will be described in greater detail with reference to the examples according to FIGS. 2 to 8 in the accompanying drawings, in which FIG. 1 shows a system employing message-based synchronization when the system is in synchronization with the clock frequency of a master source, FIG. 2 shows a network employing self-organizing master-slave synchronization (SOMS) in an initial state, FIG. 3 shows the network of FIG. 2 in a stable state, FIG. 4 illustrates the resynchronization of the network of FIG. 3 when the master node has failed.

DETAILED DESCRIPTION OF THE PRESENTLY PREFERRED EXEMPLARY EMBODIMENT

Figure 5:
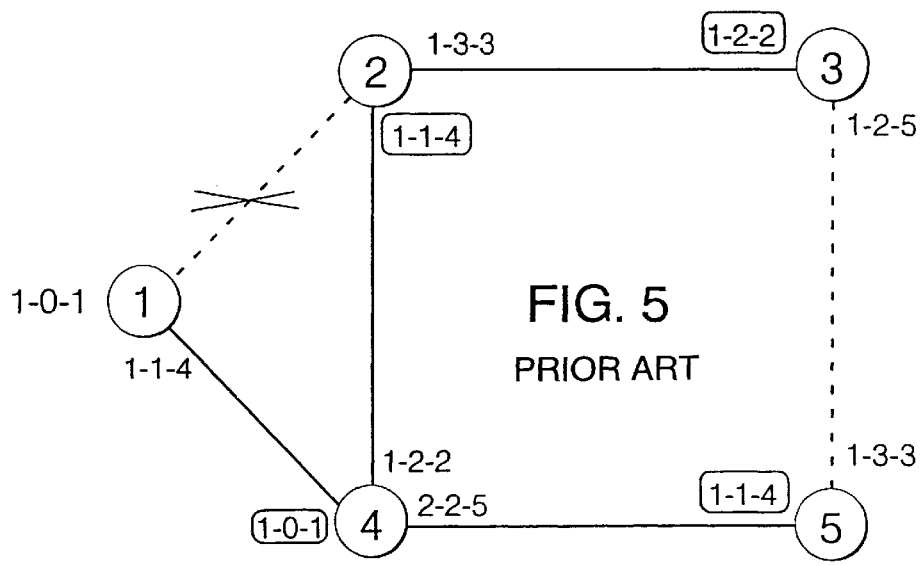
FIG. 5 illustrates the resynchronization of the network of FIG. 3 when a connection between two nodes has failed.

FIG. 2 illustrates a system employing the aforementioned self-organizing master-slave synchronization (SOMS), which is a message-based synchronization method known per se. In this specific case, the system comprises five nodes (or devices) which are indicated by the reference numerals 1 . . . 5 according to their level of hierarchy. (Each number forms the SOMS address of the node, and the master node of the network has the smallest SOMS address.) The nodes interchange messages containing such SOMS addresses. In this way the nodes are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network a synchronization message contains three different parts: a frame structure, signature and check sum. The SOMS signature is the most important part of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a parameter describing the quality of a connection, and it is typically a distance to a node indicated by D1. The distance is given as the number of intermediate nodes.

D3 is the SOMS address of a transmitting node.

The parameters central to the present invention are the distance parameter D2 and the parameter D1 describing the original synchronization source. (It should be mentioned that for example in the system disclosed in the aforementioned reference 1, the parameter describing the original timing source is incorporated into the same parameter with the distance parameter.)

Each node (or device) compares continuously incoming SOMS signatures with each other and selects the smallest amongst them. In the signature the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master node, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighbouring nodes as its new synchronization source on the basis of an incoming SOMS signature, it has to regenerate its own (outgoing) SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a signature smaller than the internal signature, the node uses its own internal oscillator or possibly a separate synchronization input as the source of its clock frequency. Of course, the outgoing SOMS message thereby employs the internal SOMS signature.

The nodes transmit continuously SOMS messages in all directions in order that any changed data in the SOMS signatures would be distributed as rapidly as possible and that they would know the current operating condition of neighbouring nodes. The SOMS signatures cannot be compared with each other until the incoming SOMS messages have been accepted and the SOMS signatures have been extracted from the messages.

When the first SOMS message is received from a specific transmission line, the SOMS signature contained therein is accepted immediately for comparison if the message is faultless. When the incoming transmission line has an accepted SOMS signature and faultless messages containing the same signature are received continuously, the situation remains unchanged. If the SOMS message is found to be faulty, the current SOMS signature is retained until (for example) three successive faulty SOMS messages have been received. At this stage the old SOMS signature is no longer accepted for comparison. Waiting for three successive SOMS messages aims at eliminating temporary disturbances.

If no SOMS message is received from the line and there is no line failure, the current SOMS signature is rejected only after a period of time corresponding to (for example) three successive SOMS messages. If the line fails totally, the SOMS signature is rejected immediately. If no appropriate SOMS signature is available for comparison due to disturbances in the incoming signal, the SOMS signature of the transmission line is rejected. A constant-value signature where all parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way there will be no unnecessary delays in network changes.

Initially each node employs its own internal synchronization source, and transmits its own internal SOMS signature X-O-X to the other nodes. This signature is also compared with incoming SOMS signatures. If none of the incoming signatures is smaller than the internal signature, the node continues to use its own internal timing.

In FIG. 2, the SOMS network is shown in an initial state when none of the nodes (or devices) has yet processed any one of the incoming SOMS messages. In all nodes, the highest priority is assigned to the internal SOMS signature of the node as no other signatures have yet been processed. In FIG. 2, the SOMS signatures are indicated beside each node to which they are transmitted, and the selected signature is framed (in the initial situation shown in FIG. 2 all nodes employ their internal timing source). Lines used in synchronization are drawn by a continuous line and standby lines are drawn by a broken line (in the initial situation shown in FIG. 2, all lines are standby lines).

When the nodes start to process the incoming SOMS messages, node 1 retains the use of the internal timing, nodes 2 and 4 synchronize themselves with node 1 on the basis of the signature 1-0-1, node 3 is synchronized with node 2 (2-0-2), and node 5 with node 3 (3-0-3). At the same time the nodes generate their own new SOMS signatures as described above and provide their outgoing SOMS message with the new signature. The network in a stable situation is shown in FIG. 3. All nodes have synchronized with the master node 1 over the shortest possible path.

If the smallest one of the SOMS signatures entering the node changes or is lost totally when the connection fails, the node selects a new synchronization direction on the basis of the second smallest SOMS signature. Prior to this, however, the node is forced to change over to internal timing, which it retains for a preset time period in order for any faulty SOMS signatures occurring in the network to be eliminated. For instance, if node 1 in the situation of FIG. 3 should fail, nodes 2 and 4 would no longer receive the signature 1-0-1, with which they were synchronized. If they now accepted immediately the second smallest SOMS signature, the network would no longer be synchronized with a single master node but a synchronization loop would result. When node 1 fails, node 2 still receives the signatures 1-1-4 and 1-2-3, and node 4 receives the signatures 1-1-2 and 1-2-5, as nodes 3 and 5 have not yet responded to the changed situation. If the second smallest signatures were accepted immediately, node 2 would be synchronized with node 4, and node 4 with node 2. This situation is prevented by the above-mentioned forced state of internal timing, in which the nodes start to use their own internal timing source and transmit their own internal SOMS signature (X-O-X). Nodes which were synchronized with the node now in the state of internal timing detect that a change has occurred in the network and that the SOMS message on which the former synchronization was based is no longer valid as it has been changed into the internal SOMS message of the neighbouring node. As a consequence, the nodes also enter into the forced state of internal timing for a preset time period.

If the master node fails in the case of FIG. 3, the nodes 2 and 4 are immediately forced to enter into the state of internal timing when they lose the incoming SOMS signature 1-0-1. When the nodes 3 and 5 detect the change that has taken place in the nodes 2 and 4, they are also forced to enter into the state of internal timing. When node 2 reverts to the normal state, it receives the internal SOMS signatures (3-0-3 and 4-0-4) from the nodes 3 and 4 and retains the use of the internal timing as the SOMS signatures received from outside are not smaller than its own internal signature (2-0-2). Node 4 is then synchronized with node 2. After having stabilized, the network is in the state shown in FIG. 4, where node 2 is the new master node of the network. If for example only the connection between the nodes 1 and 2 breaks (FIG. 5), only node 2 is forced into the state of internal timing. On reverting to the normal state it synchronizes itself with node 4 having a connection to the master node of the network. After the stabilization of the entire network, the synchronization still originates from node 1 despite the break. This is illustrated in FIG. 5.

As mentioned above, an outdated synchronization signature having the wrong synchronization status may keep on circulating in the network for example due to a failure situation in a network of the type described above, and in circulating in the network the signature soon causes a disorder in the synchronization of the entire network. By means of the method according to the invention, such a circulating signature is detected and procedures are started in order to revert to the normal state of the network.

Figure 6:
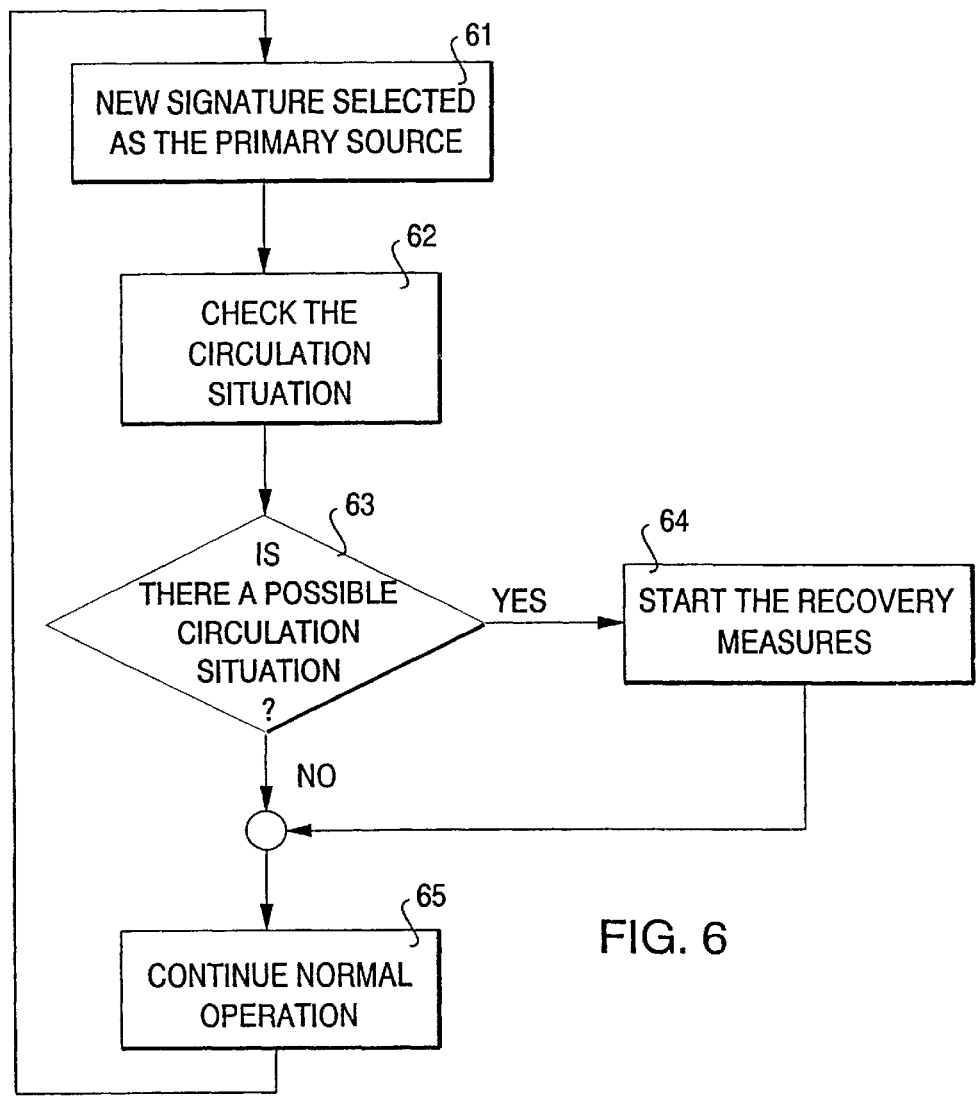
FIG. 6 is a flow chart illustrating the main steps of the method according to the invention.

FIG. 6 is a flow chart illustrating the main steps of the method according to the invention. Whenever a node has selected a new synchronization source on the basis of a new synchronization signature (step 61), the circulation situation of the synchronization signature is checked according to the invention (step 62). If a possible circulation situation is detected (step 63), recovery measures are started (step 64). Otherwise normal operation is continued (step 65) and the situation is checked again after the node has selected a new incoming synchronization signature on the basis of which a new outgoing synchronization signature should be formed.

Figure 7:
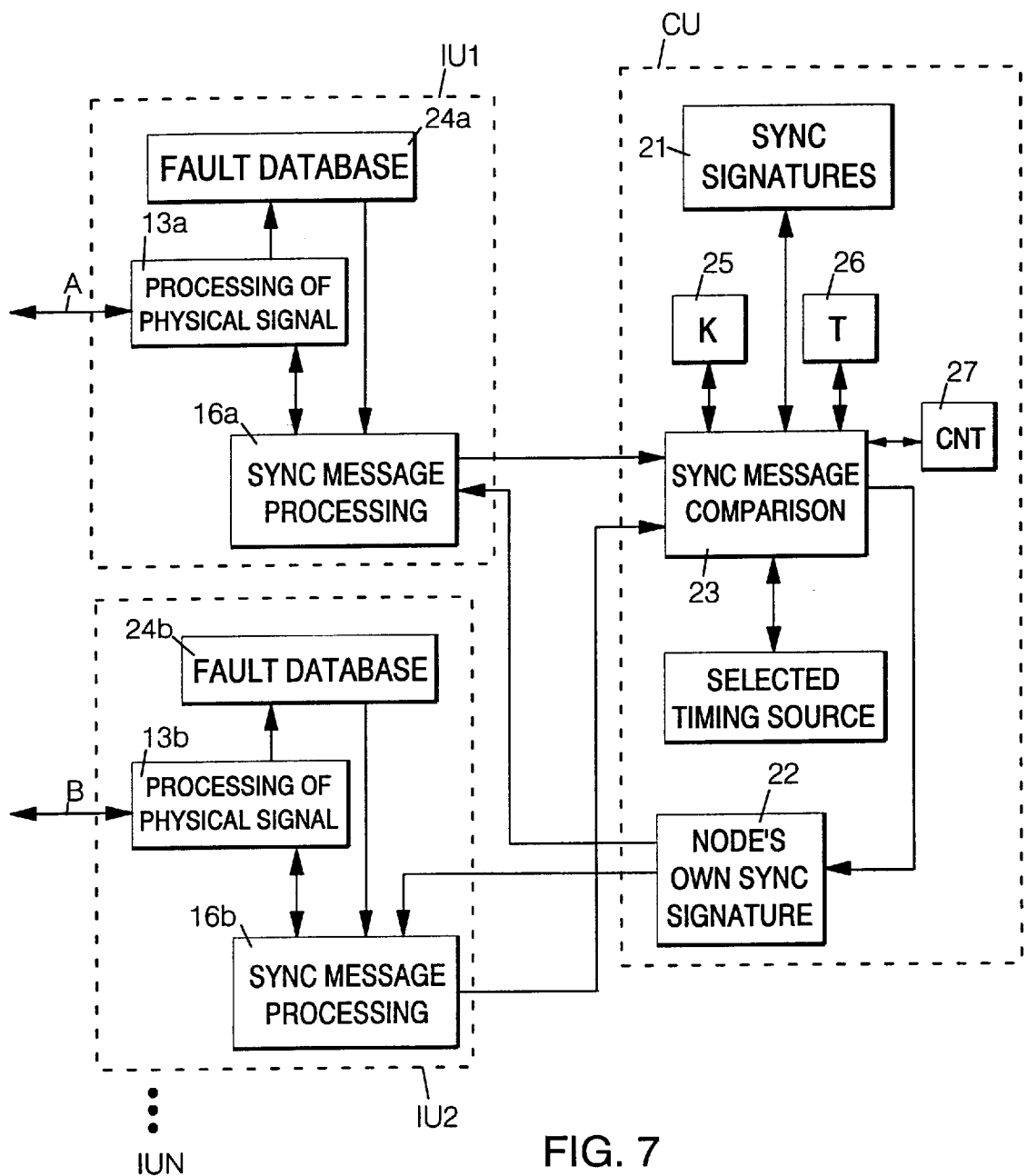
FIG. 7 shows means provided in each individual node for realizing the method according to the invention.

Figure. 7 shows means provided in each node for realizing the method according to the invention. The general structure of the node comprises several parallel interface units IU1, IU2 . . . IUN each of which is connected to a neighbouring node, and a control unit CU which is shared by all interface units and which is the location of decision-making concerning the synchronization. The figure shows two transmission connections A and B between a system node and neighbouring nodes, both connections being connected to their own interface unit. The transmission connections are typically for example PCM lines of 2 Mbit/s complying with the CCITT recommendations G.703 and G.704, or SDH lines according to the recommendations G.708 and G.709. Synchronization messages can be transmitted in different ways in such signals; one example is disclosed in the co-pending Finnish Patent Application 940926 which also describes the general structural models of the node.

Each transmission connection is connected to a signal transmission and reception means 13a and 13b, respectively, which process the physical signal. The means 13a and 13b forward the synchronization message to an associated synchronization message transmission and reception means 16a and 16b, respectively. The transmission and reception means 16a and 16b for example check whether the message is faultless and forward the message to a centralized node synchronization decision means 23 having a respective input connected to the output of the respective transmission and reception means 16a, 16b. The signal transmission and reception means 13a and 13b also supervise the quality of the received signal and store information thereon into interface-specific fault databases 24a and 24b, respectively. The synchronization message transmission and reception means 16a obtains fault data from the database 24a and the transmission and reception means 16b from the fault database 24b, respectively. The signal transmission and reception means monitor failures/changes in the connection in a manner known per se.

The decision means 23 of the control unit CU compares the messages and stores them in a memory 21, e.g. in priority order so that the selected synchronization signature always has the highest status. The decision means also receives the fault data of a signal from the corresponding interface unit in the form of a synchronization message or as separate fault data. When the decision means judges from the supplied data that the node has to enter into the standard state for the preset time period, it selects the source of its timing as defined in the applied synchronization method for this kind of situation; it applies an appropriate synchronization signature to the interface-specific synchronization message transmission and reception means 16a and 16b from a memory 22 (where it generates an outgoing signature used in each particular case), and starts a timer means 25. The node informs the neighbouring nodes about the change that has occurred by transmitting the new signature. When the timer means 25 indicates that the preset time period K has expired, the decision means 23 is again allowed to select the source of timing according to a normal procedure.

When the decision means 23 has selected a new synchronization signature (on the basis of which it (possibly) forms later the node outgoing signature), it also starts a second timer means 26 related to the method according to the present invention. The timer means 26 measures the time period during which the distance parameter of the synchronization signature must increase a predetermined number of times (the changes must occur in succession) so that the situation would be interpreted as the circulation of an outdated synchronization signature. Every time the distance parameter increases within the time period measured by the timer means 26 and the parameter describing the original timing source does not change, the decision means increments the counter 27. If the counter reaches a predetermined threshold value within the time period T measured by the timer means, the situation is interpreted as the circulation of an outdated synchronization signature, thus leading to the aforementioned recovery measures being started, which in practice means for example that (SOMS network) the node is forced to enter into the state of internal timing, whereupon the decision means starts the timer means 25 corresponding to the state of internal timing. Simultaneously with the starting of the recovery measures the decision means 23 resets both the counter 27 and the timer means 26.

Figure 8:
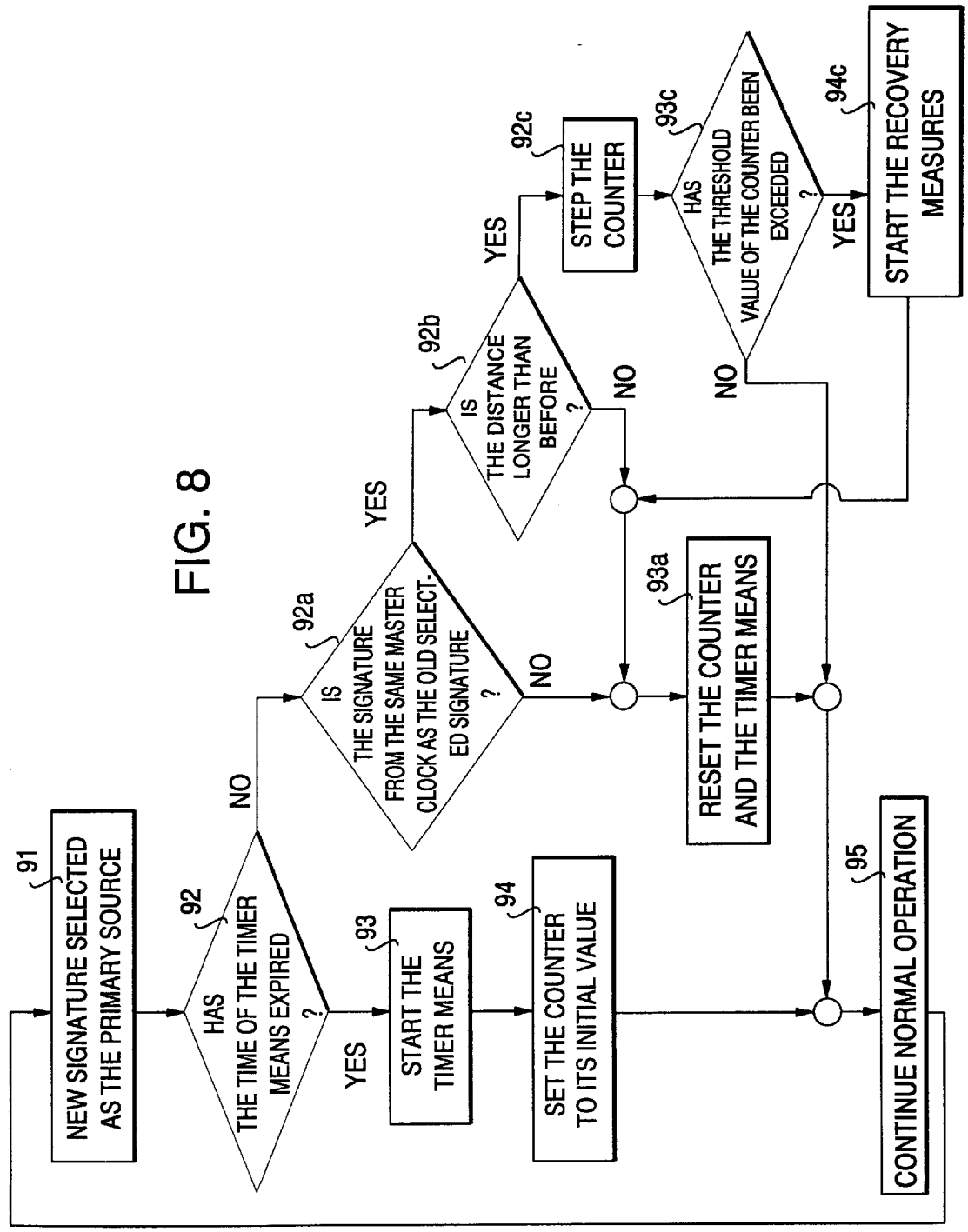
FIG. 8 is a flow chart illustrating a more detailed embodiment of the method according to the invention.

FIG. 8 shows a more detailed embodiment of the basic principle illustrated in FIG. 6, applicable for example in the SOMS network. Whenever a new synchronization signature is placed on the top of the priority list (step 91), it is first examined whether the time T measured by the timer means has expired (step 92). If it has, the decision means starts the timer means 26 (step 93) and sets the counter 27 back to its initial value (step 94). The node then continues its normal operation (95) checking again the time that is left in the timer means when a new synchronization signature has been selected, the new node outgoing signature being derived from this signature.

If the node decision means detects in step 92 that the time of the timer means has not expired yet, it examines (step 92a) whether the new synchronization signature originates from the same master clock as the old signature. In a SOMS network this can be performed for example in such a way that the decision means compares the first part D1 of the new signature to the first part of the node outgoing signature to see if they are identical. If they are, the decision means enters into step 92b in which it examines whether the distance parameter contained in the synchronization signature has increased from its earlier value. In a SOMS network this may be performed for example by examining whether the second part D2 of the new signature is the same or bigger than the second part of the node outgoing signature. If it is, the distance parameter has increased, whereupon the decision means steps the counter 27 one step forward (step 92c). It is then examined (step 93c) whether the counter has reached its threshold value (or whether this value has been exceeded, depending on how the threshold value is defined). If it has, the node decision means starts the above-described recovery measures in order to eliminate the old signature from the network. The counter 27 and the timer means 26 are then reset (step 93a), and normal operation is continued (step 95). The same procedures (resetting the counter and the timer means, and transition to the normal operation) are also performed if it is detected in step 92a that the new synchronization signature does not originate from the same master clock as the old signature, and also if it is found out in step 92b that the distance parameter has not increased from its earlier value.

As the description above illustrates, the timer means 26 and the counter 27 are reset whenever the parameters of the signature do not correspond to the required "circulation criteria", i.e. the changes complying with the criteria must be successive in order that the threshold value of the counter 27 would be reached. If synchronization is selected on the basis of an incoming synchronization signature which is better than the previous selected signature or in which the parameter describing the original source deviates from that of the previous selected signature, the counter and the timer means are reset. They are also reset whenever the node is started.

In an actual realization of the method, the time period T of the timer means 26 and the threshold of the counter 27 can be parametrized in a desired manner.

The recovery measures may also vary. It is for example possible to select a fixed external source for a certain time period and to retain it for the time period, or the node may transmit a certain message to the direction with which it is synchronized. Each node forwards this message to the direction with which it is synchronized. If a node receives its own message, it enters into a predetermined standard state, e.g. the state of internal timing.

According to a preferred embodiment of the invention, the above-described check-up of the circulation situation is performed in full before the node outgoing signature is formed on the basis of the new synchronization signature. This prevents a situation in which a node transmits a certain, in a way incorrect signature for a short while and then enters for example into the transmission of the internal signature. The node outgoing signature is thus formed only in step 65 (FIG. 6) or step 95 (FIG. 8), and the new received synchronization signature is used in the formation only if it has first been discovered that there is no reason to start the recovery measures.

Even though the invention is described above with reference to the examples according to the accompanying drawings, it is clear that the invention is not restricted thereto, but it may be modified within the inventive idea disclosed above and in the appended claims. Even though the SOMS system has been used as an example above, the solution according to the invention is applicable in all similar systems where the synchronization signature contains in some form information about the distance to the master clock of the network and about the original timing source. Furthermore, when the synchronization signatures on the priority list are described above and in the appended claims, it is clear that the list may also comprises any other signature, for example a port, on the basis of which the timing source can be identified, wherefore the wording of the claims should be understood to be general in this sense.

I claim:

1. A hierarchical synchronization method for a node in a telecommunications system employing message-based synchronization and comprising a plurality of nodes interconnected by transmission lines, said method comprising:

interchanging, with neighboring nodes, signals containing synchronization messages having a synchronization signature, said synchronization signature indicating the priority of the respective signal in the internal synchronization hierarchy of the telecommunications system and containing a distance parameter representing a distance to a master source of synchronization and a master node parameter indicating an original synchronization source, synchronizing with the one of signals received from said neighboring nodes which has the highest priority in the internal synchronization hierarchy, maintaining a synchronization list comprising, on the highest level, the synchronization signature of said signal with which the node is synchronized, monitoring said distance parameter and said master node parameter in said synchronization signature on the highest level in said synchronization list, changing over from a normal state to a predetermined state in order to prevent synchronization with signals having faulty synchronization signatures, when the value of said distance parameter increases a predetermined number of times within a predetermined monitoring period while said master node parameter remains unchanged within said monitoring period.

2. A method according to claim 1, comprising:

measuring said monitoring period with a timer means which is started whenever the time period measured has expired and a new synchronization signature is selected and placed on the highest level in the priority list, and counting said successive times with a counter.

3. A method according to claim 2, comprising setting the counter to its initial value, when the timer means is started.

4. A method according to claim 3, comprising increasing the counter within said monitoring period each time the value of said distance parameter in the new signature has increased from the value of said distance parameter in the old signature and when said master node parameter is the same as that in the old signature.

5. A method according to claim 2, comprising:

using internal timing in said predetermined state, and resetting said timer means and said counter in response to the transition to said predetermined state.

6. A method according to claim 1, comprising:

forcing the node to synchronize itself with an external source in said predetermined state, and resetting said timer means and said timer means and said counter in response to the transition to said predetermined state.

7. A node equipment for a telecommunications system employing message-based synchronization and comprising a plurality of nodes interconnected by transmission lines, said node comprising:

several interfaces to which the transmission lines to the neighboring nodes are connected, means for generating a synchronization signature to be transmitted between the nodes from a signal received at an interface, said synchronization signature indicating the priority of the respective signal in an internal synchronization hierarchy of the telecommunications system and containing a distance parameter representing a distance to a master source of synchronization and a master node parameter indicating an original synchronization source, means for comparing synchronization signatures received from the interfaces with each other, means for selecting the synchronization signature with the highest priority as a source of a node synchronization, means for forming a node outgoing synchronization signature on the basis of the selected synchronization signature, means for counting the number of times in succession the value of said distance parameter received in a new synchronization signature received is higher than the value of said distance parameter in the selected synchronization signature while the master node parameter is unchanged, and means for changing the node from a normal state into a predetermined state in order to prevent a selection of faulty synchronization signatures.

* * * * *